United States Patent [19]

Morey

[11] Patent Number: 5,316,779
[45] Date of Patent: May 31, 1994

[54] FOAM-LIMITING DRINKING CUP AND METHOD

[76] Inventor: Booker W. Morey, 2512 Cowper St., Palo Alto, Calif. 94301

[21] Appl. No.: 760,704

[22] Filed: Sep. 16, 1991

[51] Int. Cl.$^5$ .................. A23L 2/38; B65D 25/14
[52] U.S. Cl. .................. 426/329; 229/1.5 B; 206/217; 426/86; 220/458; 428/35.7; 141/92
[58] Field of Search .................. 426/86, 329, 330.3, 426/131, 398, 477; 229/1.5 B; 206/217; 141/92; 220/458

[56] References Cited

U.S. PATENT DOCUMENTS

| | | | |
|---|---|---|---|
| 1,116,399 | 11/1914 | Elsas | 206/217 |
| 1,592,395 | 7/1926 | Sulzberger | 206/217 |
| 1,770,118 | 7/1930 | Williams | 206/217 |
| 1,889,111 | 11/1932 | Serr | 206/217 |
| 2,062,897 | 12/1936 | Michel et al. | 206/217 |
| 2,118,184 | 5/1938 | Fronmuller et al. | 426/329 |
| 2,929,716 | 3/1960 | Barch et al. | 426/329 |
| 2,953,459 | 9/1960 | Diller | |
| 3,100,151 | 8/1963 | Breivik et al. | 426/329 |
| 3,142,572 | 7/1964 | Miller et al. | 426/329 |
| 3,202,275 | 8/1965 | Loughary | 206/217 |
| 3,252,803 | 5/1966 | Belasco | 206/217 |
| 3,370,706 | 1/1967 | Sagi et al. | 426/329 |
| 3,407,922 | 10/1968 | Palmer | 206/47 |
| 3,526,316 | 9/1970 | Kalogris | 206/47 |
| 3,879,565 | 4/1975 | Einstman et al. | 426/329 |
| 3,915,296 | 10/1975 | Spencer | 206/217 |
| 3,983,251 | 9/1976 | Singh | 426/329 |
| 4,069,933 | 1/1978 | Newing | 426/398 |
| 4,091,954 | 5/1978 | Wallace | 426/398 |
| 4,096,947 | 6/1978 | Morse | 206/519 |
| 4,105,802 | 8/1978 | Cho et al. | 426/329 |
| 4,185,122 | 1/1980 | Furia | 426/329 |
| 4,311,250 | 1/1982 | Ravve et al. | 426/398 |
| 4,312,889 | 1/1982 | Melsheimer | 426/86 |
| 4,343,819 | 8/1982 | Wood et al. | 426/96 |
| 5,096,721 | 3/1992 | Levy | 426/66 |

FOREIGN PATENT DOCUMENTS

| | | | |
|---|---|---|---|
| 300789 | 5/1968 | Sweden | 426/86 |
| 2057306 | 4/1981 | United Kingdom | 426/86 |

OTHER PUBLICATIONS

Modern Packaging Nov. 1953 pp. 149–153.
Food Engineering Feb. 1956 pp. 52–54.
Food Industries Jan. 1951 pp. 44–46, 194.
Food Engineering Jul. 1954 pp. 121, 135.

*Primary Examiner*—Steven Weinstein
*Attorney, Agent, or Firm*—Victor R. Beckman

[57] ABSTRACT

A container (8) which includes a disposable cup (10) is shown, together with a coating (12) of food-grade antifoaming agent at the inner surface of the cup. A method of speeding filling of the container is disclosed which includes pouring a beverage that foams and forms a foam head when poured into the cup. Collapse of the foam head is accelerated by the antifoaming agent (12) to permit an increase in the filling rate of the cup without overflow.

18 Claims, 1 Drawing Sheet

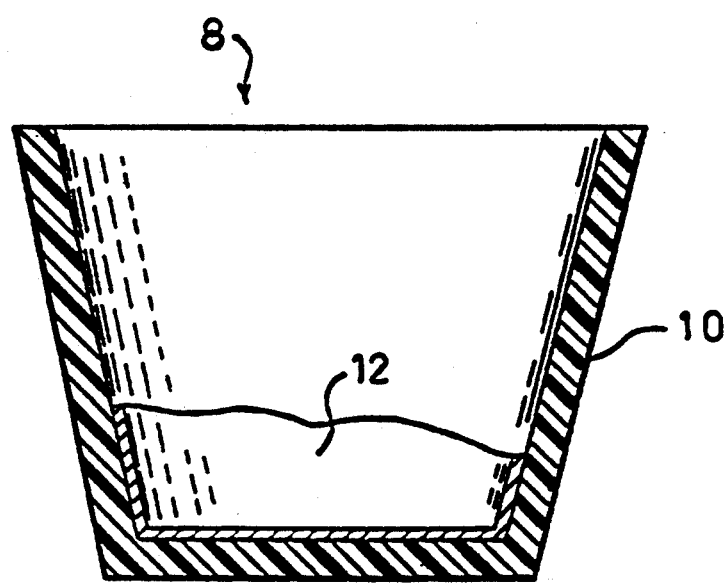

FOAM-LIMITING DRINKING CUP AND METHOD

FIELD OF THE INVENTION

This invention relates to foam-limiting drinking cups and a method of increasing the speed of filling a drinking cup by accelerating the rate of collapse of the foam head which results from pouring a beverage into a cup.

BACKGROUND OF THE INVENTION

Beverages, such as carbonated soft drinks, form a foam head when poured into a cup due to the rapid release of the carbonation during pouring from a can, dispenser, or the like. The low surface tension of plastic and waxed cups offer many nucleation sites to further contribute to foaming. When a foam head is formed, the server must wait 10 to 15 seconds for the head to collapse before adding to the cup until it is full. Alternatively, the server may pour at an extremely slow rate to minimize agitation and formation of a foam head, in which case a comparable time is required to completely fill the cup without overflowing the same. Of many carbonated beverages, those containing the artificial sweetener aspartame produce the most foaming and most persistent foam. Root beer, with or without aspartame, is also persistent in foam.

Many businesses are faced with the problem of rapidly serving a large number of drinks in disposable cups over limited time periods, which problem is exacerbated by the waiting time required for the foam head to dissipate before the cup may be filled. For example only, substantially all domestic scheduled airlines serve complementary soft drinks in disposable, single-use plastic or paper cups. Generally, flight attendants add ice to the empty cup and pour a room-temperature carbonated beverage over the ice in order to cool the beverage. Carbonation released during pouring results in a persistent foam head that occupies on the order of 20 to 25% of the volume of the cup. Passengers expect a full cup of beverage, and so the flight attendant must wait until the foam head collapses and then add to the cup until it is full. This wastes the time of the attendants which especially on short flights and/or full flights is very limited. To speed up service, the attendant sometimes gives the passenger the cup and entire can without filling the cup, or after partially filling the same. Although this is an effective solution to the wasted time problem it is more expensive to the airline since one can usually fills three cups. Airlines have also tried stocking smaller cans of carbonated beverages, such as the 5.5 ounce size commonly used on overseas flights, but domestic passengers often complain because they feel cheated by the small portion. Other businesses such as movies, sporting events, fast food chains and other restaurants and convenience stores where rapid serving of carbonated beverages in disposable cups is practiced are faced by the same problems in filling of the cups.

The prior art includes many designs of disposable or single use cups that have been modified to hold a single serving of a powder which, when mixed with water or carbonated water at the time of use, dissolves to make a beverage of the concentration needed to fill the cup. Examples of such designs include U.S. Pat. Nos. 3,915,296, to Spencer; 4,096,947, to Morse; 3,407,922, to Palmer and 3,526,316, to Kalogris. Also, the use of an antifoaming agent as part of dry beverage powder formulations that produce various flavors and carbonation when plain water is added is known in the prior art. Examples include U.S. Pat. Nos. 3,983,251, to Singh; 2,953,459, to Diller; and 4,343,819, to Wood.

SUMMARY AND OBJECTS OF THE INVENTION

An object of this invention is the provision of an improved container which avoids the above-mentioned problems of wasted time required to fill conventional cups with beverages which foam and form a foam head when poured.

An object of this invention is the provision of an improved method of speeding the filling of a drinking cup with a beverage that foams and forms a foam head when poured without overflowing the cup.

The present invention includes a disposable drinking cup of conventional design made of plastic, paper, or the like. A food-grade antifoaming agent, which may be of a commercially available type, is affixed to the inner surface of the cup prior to pouring a beverage that foams when poured into the cup. The antifoaming agent accelerates the rate of collapse of the foam head produced when the beverage is poured. Consequently, the time required to fill the cup without overflowing the same is substantially reduced. The present method includes providing a drinking cup, applying an antifoaming agent at the inner surface of the drinking cup, and pouring a beverage which forms a head when poured into the cup. In the presence of the antifoaming agent, the foam head quickly dissipates allowing for rapid filling of the cup without overflowing.

BRIEF DESCRIPTION OF THE DRAWING

The invention, together with other objects and advantages thereof, will be better understood from the following description considered with the accompanying drawing. It will be understood that the illustrated embodiment of the invention is included herein by way of example only and that the invention is not limited thereto.

The single FIGURE is a vertical sectional view of a cup with an antifoaming agent applied to the inner surface thereof.

Referring to the drawing, a container 8 comprising a disposable cup 10 is shown which cup may be of conventional design, and may be made of plastic, paper, or like material. Where plastic in employed, it may be of a foamed or nonfoamed type. Also, it may be formed in a conventional manner using known manufacturing techniques.

Prior to pouring a beverage that foams when poured into the cup, a food-grade antifoaming agent 12 is applied to at least a portion of the inner surface of the cup. Any suitable antifoam product may be employed including, for example, the commercially available food grade antifoams identified as "Dow-Corning Antifoam 1500" and "Dow-Corning Antifoam A" from Dow-Corning Corporation, and "Union Carbide SAG 710" from Union Carbide Corporation, which are dimethylpolysiloxane antifoams as shown in U.S. Pat. Nos. 4,498,467, 4,824,475 and 4,997,670. Other food-grade antifoams are commercially available. The SAG 710 antifoaming product comprises an emulsion. For purposes of illustration only, antifoaming agent 12 is shown applied to the inner surface of the cup bottom and side walls.

The antifoaming agent may be applied at the time of manufacture of the cups or at any time between the manufacture thereof and the use thereof. For example only, it may be applied prior to packaging of cups, or it may be applied by the server immediately prior to pouring of the beverage. Any suitable means may be used for applying the antifoaming agent to the inner surface of the cup including dropping, spraying, wiping and the like. It may be applied at full strength or in a diluted form if desired. For example, it can be sprayed at full strength as obtained from the producer, diluted with a suitable diluent such as propylene glycol or, if it is an emulsion, it may be sprayed on in diluted form. When wiped on, a wipe can first be wetted with the required amount of antifoam and rubbed on the inner surface, then rewetted with the same amount of antifoam which then is applied to the next cup. Obviously, any convenient method may be used. If antifoam is applied just prior to use, then use of a metered-dose sprayer provides for a particularly easy method of application in a desired amount. The antifoam may be carried in a liquid vehicle that evaporates following application leaving a dry film of antifoam on the inner surface of the disposable cup. Preferably it is applied as a thin film on the inner bottom and sides of the cup. In practice, only a small amount of antifoaming agent is required. For example only, approximately 25 milligrams of the Union Carbide antifoaming agent "SAG 710" may be employed in a 9-ounce cup for foam control of carbonated beverages, even those beverages which produce large amounts of foam. This antifoaming agent in such small amounts is barely visible when applied as a film to the cup. Where the maximum amount of antifoaming agent for use in beverages is established by law, it will be apparent that the amount used would not exceed such maximum allowable amount. The amount of antifoaming agent included in the beverage, if any, is taken into account when determining the maximum applied to the cup.

EXAMPLE

A 9-ounce plastic cup was treated with approximately 25 milligrams of the food-grade, emulsified commercial antifoaming agent "Union Carbide SAG 710", which amount is the equivalent of 100 ppm of the antifoam, if all of it disperses in the beverage. This is the recommended and allowed amount in food according to the manufacturer, Union Carbide Corporation. It was touched to the inner bottom surface of the cup and wiped on the inner sides thereof. An equal quantity of ice was added to this treated cup and to a control cup with no antifoam added. Both cups were of identical construction, except for the addition of antifoam to the treated cup. A can of room temperature "Diet Pepsi", a carbonated beverage containing the artificial sweetener aspartame, was poured into the control cup as fast as possible without overflowing, and the cup was filled to a reference line substantially ¼ inch from the top. It took 15 seconds to fill the untreated control cup. The treated cup was then filled from the same can and filled to the same reference mark without overflowing. It took only 7 seconds to fill the treated cup, without any tendency to overflow. It here will be noted that "Union Carbide SAG 710" is a prepared emulsion containing 10% active antifoam. Therefore, the 25 milligrams of this antifoaming agent applied to a 9-ounce cup provides the cup with 2.5 milligrams of active antifoam.

In addition to a substantial savings in time needed to pour foaming beverages, other advantages include the fact that untreated cups of conventional design may be employed with no design or manufacturing modifications. Only the application of an antifoam compound to the inner surface of the cup before the beverage is poured is required. Furthermore, the invention does not require any modification of the beverage by the manufacturer to fill the relatively small market sector to which the present invention is directed. With this invention, there is no need for carbonated beverage manufacturers to make any change in proven formulations, yet the performance of the beverage is improved for those customers who value rapid dispensing. Additionally, the antifoam does not change the taste of the carbonated beverage. From the above, it will be apparent that the present invention is adapted for use with finished, ready-to-drink, carbonated beverages that also are adapted for consumption without use of the novel cup of this invention. The antifoaming cup of this invention functions to accelerate collapse of the foam head created when a ready-to-drink carbonated beverage is poured into the cup without changing the taste of the beverage.

Another advantage of the antifoaming cup of this invention is that it may be used with non-foaming beverages with no noticeable effect, or change, in the beverage, including the taste thereof. Benefit derives from being able to use the same treated cups for different beverages without the need to provide different cups therefor.

The foam head formed on beer when dispensed is much stronger than that formed on non-alcoholic carbonated beverages. As a result, for similar amounts of antifoam, the effect on the foam head on beer is significantly smaller than that on non-alcoholic carbonated beverages. Since a foam head on beer often is perceived as part of the measure of quality thereof, the extended presence thereof may be considered desirable. Since the foam head on beer is not affected very much by use of the present cups, these cups also may be used to serve beer. This is of particular value since the server does not have to choose between the use of different cups when dispensing different beverages, including beer. The same type antifoaming cup may be used when dispensing a variety of different beverages. This is of particular advantage for use on airlines, where the purchaser of the beer fills his own cup.

The invention having been described in detail in accordance with requirements of the patent statutes, various other changes and modifications will suggest themselves to those skilled in this art. For example, the invention is not limited to use of the specific food-grade antifoaming agents mentioned above. Other antifoaming agents are well suited for use in this invention. As is well understood, antifoaming agents inhibit the formation of stable bubbles on the beverage during agitation by reducing surface tension and elasticity thereof. In addition to the use of liquid, emulsion and dry antifoams separately, it will be apparent that a mixture thereof may be used, if desired, such as a mixture of a liquid and an emulsion antifoam. Also, as noted above, the invention is not limited to the source of the beverage poured into the treated cup. As used in the present application, including the claims, the term "pouring" is intended to include dispensing of the beverage from any desired source including cans, bottles, beverage dispensers, or the like. It is intended that the above and other such changes and modifications shall fall within the spirit and scope of the invention defined in the appended claims.

I claim:

1. A container comprising a drinking cup, a coating comprising a food grade antifoaming agent that inhibits the formation of bubbles on a liquid during agitation by reducing surface tension and elasticity thereof affixed to the cup at the inner surface of the cup in an amount effective for accelerating the rate of collapse of a foam head produced by pouring a ready-to-drink aspartame-containing carbonated soft drink beverage which foams when poured into the cup and decreasing the time required to fill the cup without overflowing the same, the antifoaming agent affixed to the cup being present in an amount such that said antifoaming agent has a significantly smaller effect on the rate of collapse of a foam head on bear produced by pouring beer into the cup than on the rate of collapse of said foam head produced by pouring said soft drink beverage into the cup such that the foam head on beer poured into the cup will be retained for a longer time than the foam head on the soft drink beverage poured into the cup, thus allowing the coated cup to be used to serve the soft drink beverage or beer, which coating does not change the taste of carbonated beverage poured into the cup.

2. A container as defined in claim 1 wherein said coating comprises a liquid coating on the inner surface of the cup.

3. A container as defined in claim 2 wherein said liquid coating comprises an emulsion.

4. A container as defined in claim 1 wherein said coating comprises a dried coating on the inner surface of the cup dispersible by the beverage.

5. A container as defined in claim 1 wherein active antifoaming agent affixed to said cup does not exceed 2.5 milligrams of active antifoam in a 9-ounce drinking cup.

6. A container as defined in claim 1 wherein said drinking cup comprises a disposable plastic cup.

7. A method of speeding the filling of a drinking cup with a beverage that foams and forms a foam head when poured comprising, providing a drinking cup, applying a coating comprising a food grade antifoaming agent that inhibits the formation of bubbles on a liquid during agitation by reducing surface tension and elasticity thereof at the inner surface of the drinking cup in an amount effective to accelerate the rate of collapse of a foam head produced by pouring a ready-to-drink aspartame-containing carbonated soft drink beverage which foams when poured into the cup, the antifoaming agent being present in an amount such that the antifoaming agent has a significantly smaller effect on the rate of collapse of a foam head on beer produced by pouring beer into the cup than on the rate of collapse of said foam head produced by pouring said soft drink beverage into the cup such that the foam head on beer poured into the cup will be retained for a longer time than the foam head on the ready-to-drink aspartame-containing carbonated soft drink beverage poured into the cup, thus allowing the coated cup to be used to serve the soft drink beverage or beer, pouring a beverage into the drinking cup which beverage forms a foam head when poured, the collapse of which foam head is accelerated by the antifoaming agent permitting an increase in filling speed of the drinking cup without overflow, the taste of the beverage poured into the cup being unchanged by the coating.

8. A method as defined in claim 7 wherein the coating is applied to the inner surface of the drinking cup immediately prior to use of the cup.

9. A method as defined in claim 7 wherein the coating is applied to the inner surface of the drinking cup during the manufacture of the cup prior to shipment of the cup to the user.

10. A method as defined in claim 7 wherein the coating is applied to the inner surface of the drinking cup any time between the manufacture of the cup and just prior to use of the cup.

11. A method as defined in claim 7 wherein the beverage comprises a ready-to-drink carbonated soft drink.

12. A method as defined in claim 7 wherein the pouring step comprises pouring of the beverage from a can.

13. A method as defined in claim 7 wherein the pouring step comprises pouring of the beverage from a beverage dispenser.

14. A method as defined in claim 7 wherein the coating is applied to the bottom of the inner surface.

15. A method as defined in claim 7 wherein the coating is applied to the sides of the inner surface.

16. A method as defined in claim 7 wherein the coating is applied to both the bottom and sides of the inner surface.

17. A method as defined in claim 7 wherein active antifoaming agent is applied to the drinking cup in an amount that does not exceed 2.5 milligrams of active antifoam for a 9-ounce drinking cup.

18. A method as defined in claim 7 wherein said drinking cup comprises a disposable plastic cup.

* * * * *